May 24, 1960  A. P. DE SEVERSKY  2,937,709
GAS CONDITIONER

Filed Jan. 5, 1955  5 Sheets-Sheet 1

INVENTOR.
ALEXANDER P. DE SEVERSKY
BY
Kenyon & Kenyon
ATTORNEYS.

May 24, 1960   A. P. DE SEVERSKY   2,937,709
GAS CONDITIONER
Filed Jan. 5, 1955   5 Sheets-Sheet 2
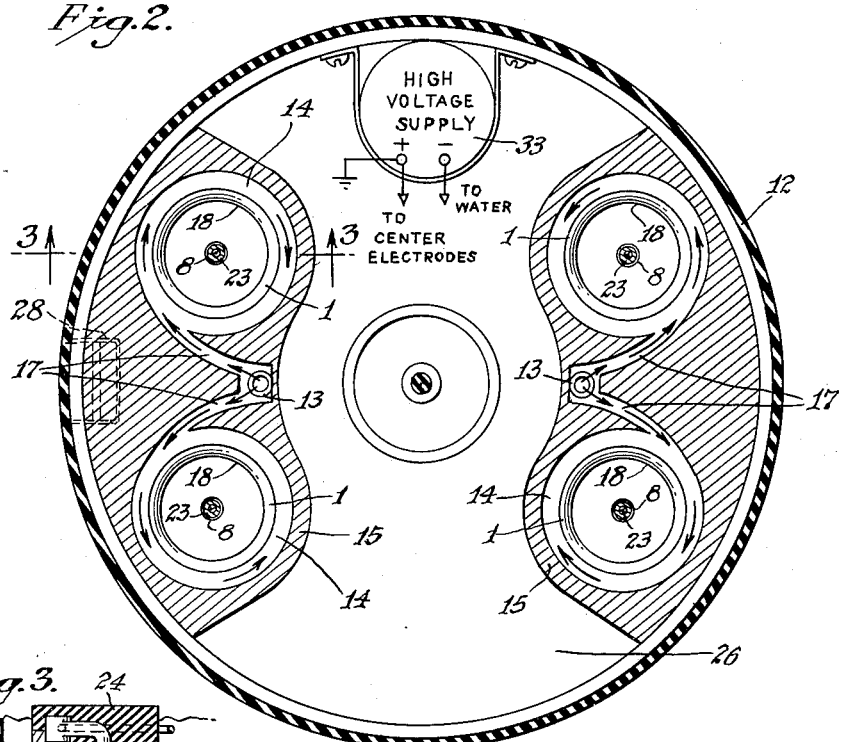
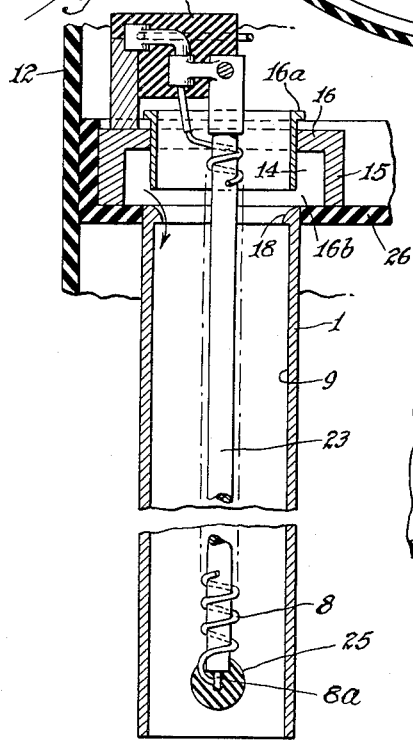
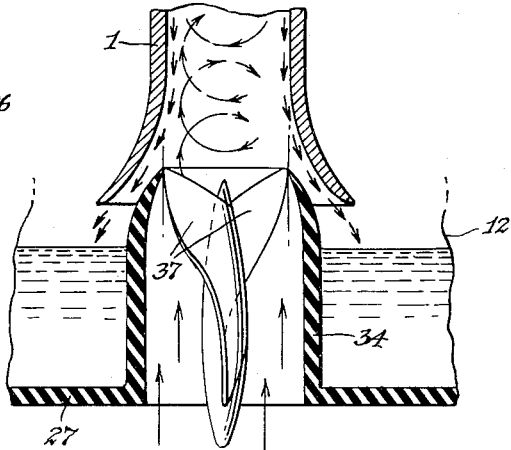
INVENTOR.
ALEXANDER P. DE SEVERSKY
BY
Kenyon & Kenyon
ATTORNEYS.

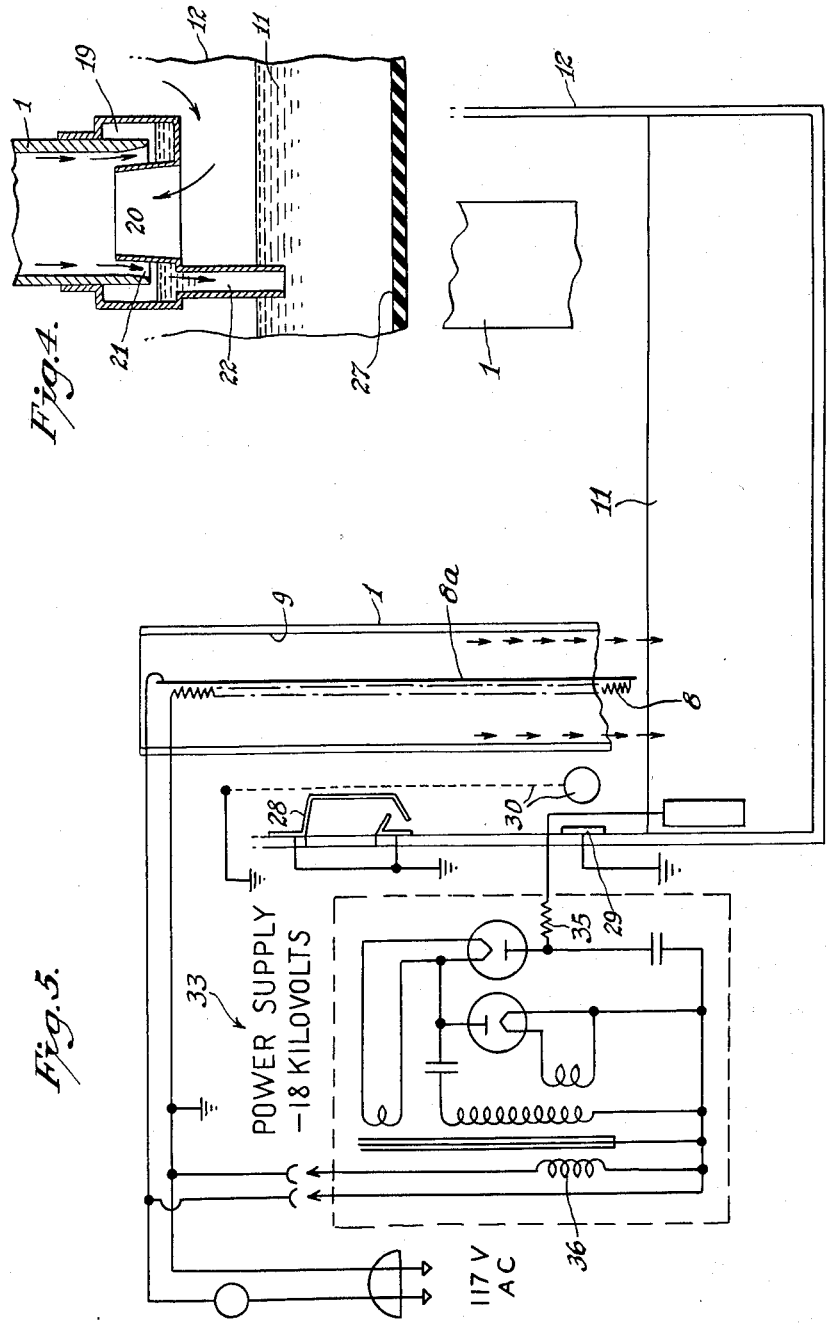

May 24, 1960
A. P. DE SEVERSKY
2,937,709
GAS CONDITIONER
Filed Jan. 5, 1955
5 Sheets-Sheet 4
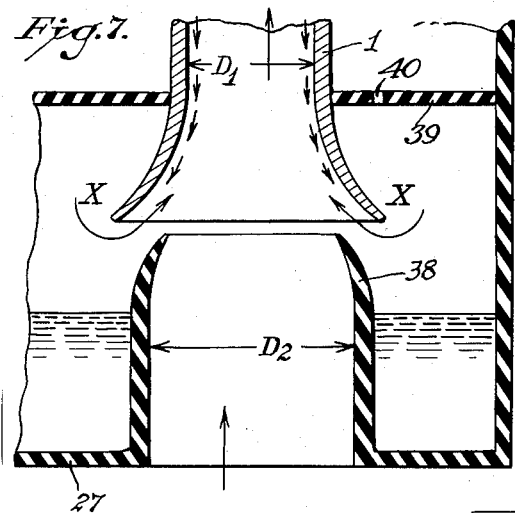
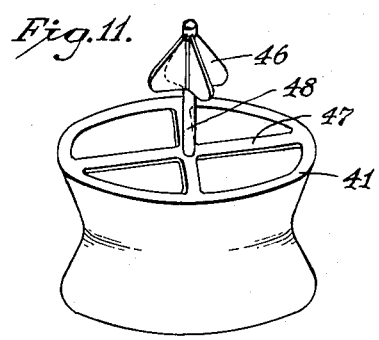
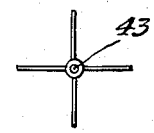
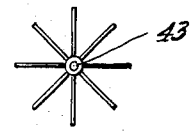
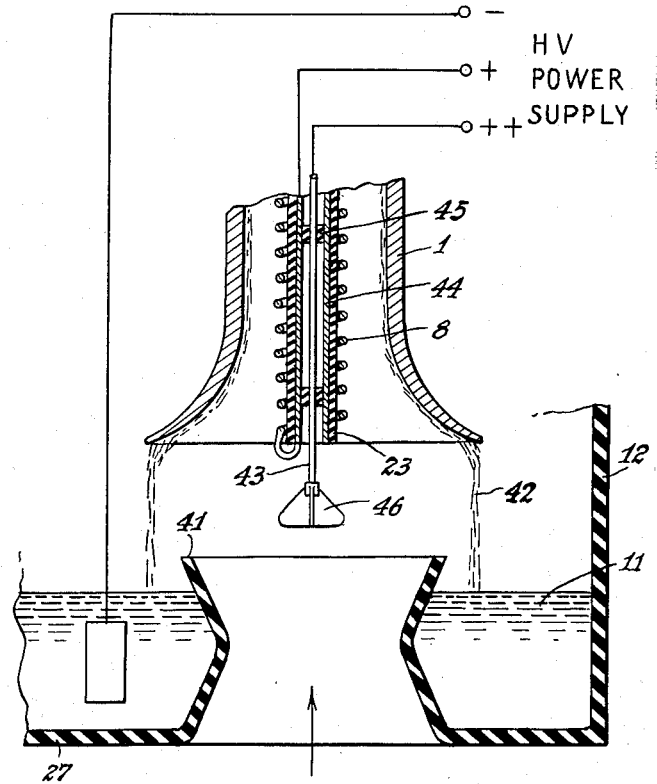
*INVENTOR.*
ALEXANDER P. DE SEVERSKY
BY
Kenyon & Kenyon
*ATTORNEYS.*

May 24, 1960  A. P. DE SEVERSKY  2,937,709
GAS CONDITIONER
Filed Jan. 5, 1955　　　　　　　　　　　　　　5 Sheets-Sheet 5
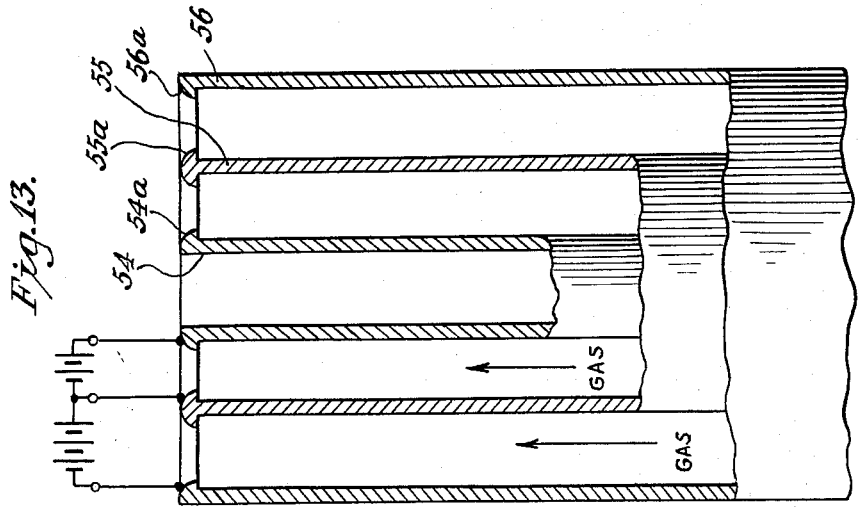
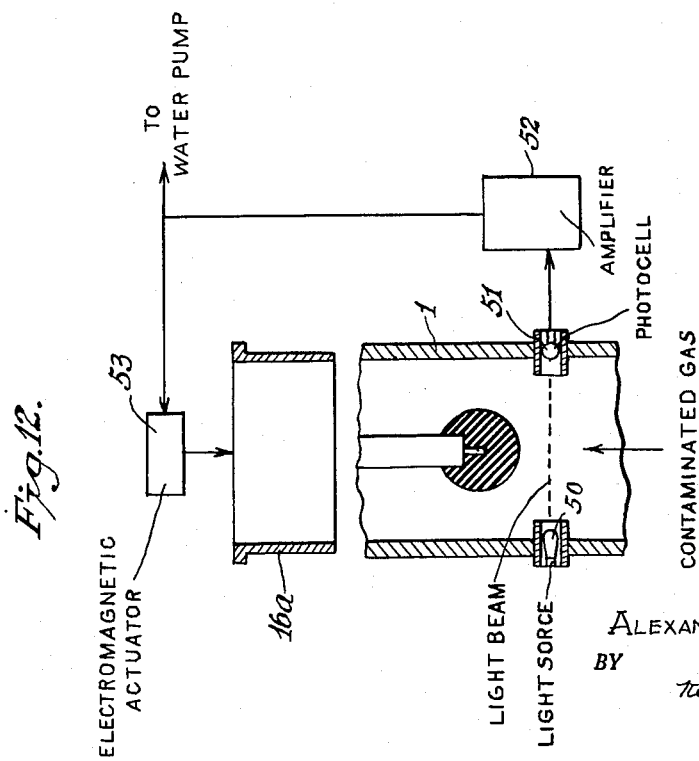
INVENTOR.
ALEXANDER P. DE SEVERSKY
BY
Kenyon & Kenyon
ATTORNEYS.

United States Patent Office 2,937,709
Patented May 24, 1960

2,937,709
GAS CONDITIONER

Alexander P. de Seversky, Northport, N.Y., assignor to Electronatom Corporation, New York, N.Y., a corporation of New York Filed Jan. 5, 1955, Ser. No. 479,909

16 Claims. (Cl. 183—7)

The present invention relates generally to gas conditioning devices, and more particularly to an improved apparatus for cleaning, humidifying and heating a gaseous stream passing therethrough. This application is a continuation-in-part of my co-pending application Serial No. 409,393, filed February 10, 1954, now abandoned.

The electrostatic precipitation of dust, smoke and like particles from the atmosphere is an art which has hitherto been confined almost exclusively to industrial applications, probably because of the unavailability of simple and effective apparatus which would not only be safe in the hands of non-industrial users but which would also withstand the abuse and lack of servicing which it would be apt to encounter in the hands of such users.

Accordingly, it is the primary object of the present invention to provide a precipitator which will satisfy the latter need, and to that end it aims at providing such essential features as: self-cleaning, operability in positions of abnormal tilt, large capacity in minimized structure, and safety against accidental electric shocks.

More particularly, it is an object of the invention to provide a gas conditioner including an electrostatic precipitator tube having a central electrode therein which is adapted not only to establish an electrostatic field in the tube for the precipitation of particles from the gaseous stream, but which also serves to heat the gas to a desired temperature. A significant feature of the invention resides in the fact that the central electrode is incandescent and self-cleaning, in that the electrical heater element thereof functions to burn off dust particles which would otherwise adhere thereto.

A further object of the invention is to provide an electrostatic precipitator of the water film type in conjunction with a heated central electrode, whereby the gas stream is both heated and humidified by evaporation from the water film. Another important feature of the invention resides in an automatic control system to adjust the thickness of the water film as a function of the density of the contaminant.

Precipitators are known which make use of a film or curtain of water along the inner wall of the tube to carry away the precipitated particles. However, wet precipitators of the type heretofore known must be carefully maintained in a level position in order to sustain the film uniformly on the inner surface of the tube. Consequently, their use is limited to stationary industrial applications. Accordingly, still another object of the invention is to provide a fluid distributor coupled to the upper end of a precipitator tube and adapted to form a substantially uniform and smooth film of water on the inner wall of the tube and to maintain the uniformity of this film even in those situations where the tube is positioned with a considerable degree of tilt, or is subjected to mechanical vibration and shock. A precipitator in accordance with the invention can be successfully applied not only to stationary industrial and home uses but to various forms of automotive transportation, such as diesel trucks, automobiles, trains, steamships, etc., without the roll, pitch, or gradient of the roadbed impairing the efficient functioning of the precipitator.

Yet another object of the invention is to provide in conjunction with an electrostatic precipitator tube of the water film type a gas inlet device adapted to feed gas into the lower end of the tube in a manner developing aerodynamic forces tending to support and smooth the water film. A gas inlet device in accordance with the invention makes possible an increased gas velocity in the tube without disruption of the water film therein.

A further object of the invention is to provide a precipitator structure including a plurality of concentric electrodes, wherein the outer electrode of one gas conduit also acts as the inner electrode of another gas conduit.

Also an object of the invention is to provide a precipitator in which the gas containing suspended particles is passed through successive electric fields, in the first of which the particles are electrically pre-ionized and in the second of which the pre-ionized particles are precipitated and trapped against redispersion into the gas stream, and are continually removed from the collecting surface. An important aspect of the pre-ionization stage in accordance with the invention is that it is anti-fouling and self-cleaning. Another outstanding feature of the invention resides in the use of a pre-ionization electrode secured to the lower end of the central electrode of the precipitator tube and functioning to stabilize the central electrode with respect to oscillations produced by the inrushing air stream.

It is also an object of the invention to provide a highly compact, mechanically rugged and efficient gas conditioning device which may be manufactured and sold at relatively low cost.

For a better understanding of the invention, as well as other objects and further features thereof, reference is made to the following detailed description to be read in conjunction with the accompanying drawings wherein like components in the several views are identified by like reference numerals. In the drawings:

Fig. 2 is a horizontal cross-section taken along the line 2—2 of Fig. 1.

Fig. 3 is a longitudinal sectional view of one of the precipitator tubes and its associated fluid distributor housed within the apparatus.

Fig. 4 illustrates in section the lower portion of the precipitator tube.

Fig. 5 is a schematic circuit diagram of the electrical power supply for the apparatus.

Fig. 6 illustrates in section a first preferred modification of a precipitator tube and its associated air intake device.

Fig. 7 illustrates in section a second preferred modification of a precipitator tube and its associated air intake device.

Fig. 8 illustrates in section a third preferred modification of a precipitator tube in conjunction with an air intake device and including a pre-ionization stage.

Fig. 9 is a bottom plan view of the pre-ionization electrode employed in Fig. 8.

Fig. 10 is another form of a pre-ionization electrode.

Fig. 11 is a perspective view showing a modified support for the pre-ionization electrode.

Fig. 12 is a schematic diagram of an automatic control system for adjusting the thickness of the water film in the precipitator.

Fig. 13 illustrates diagrammatically another embodiment of a precipitator tube in accordance with the invention.

Figure 1:
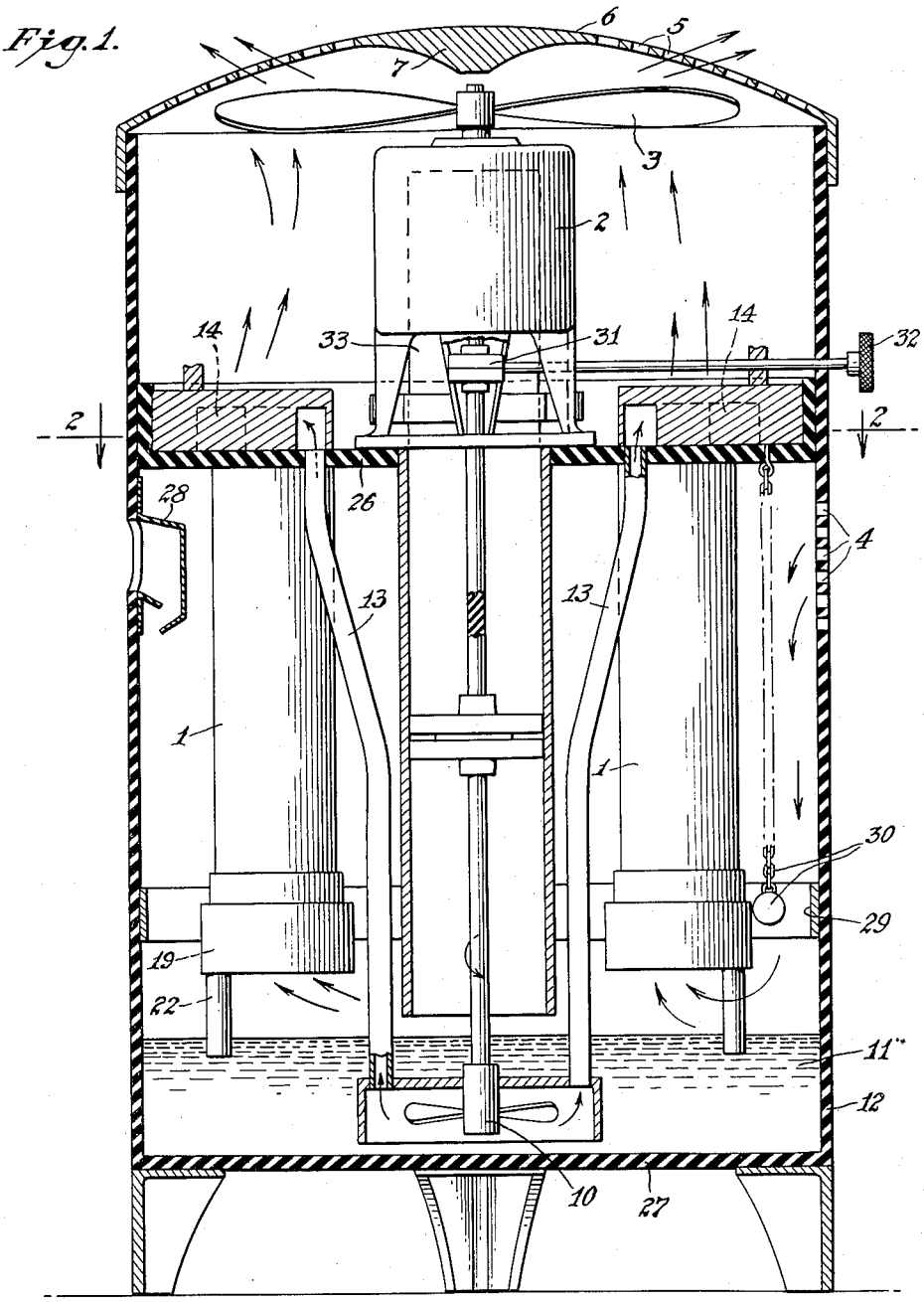
Fig. 1 is a vertical cross-sectional view taken through one preferred embodiment of a gas conditioning apparatus in accordance with the invention.

Referring now to the drawings and more particularly to the Figures 1 and 2, the preferred form of the apparatus comprises a plurality (four) of precipitator tubes 1 which are symmetrically arranged within a housing and are in the form of cylindrical conduits through which the air to be cleaned is passed while precipitation is accomplished by electrostatic fields presently to be explained. The air is propelled by the fan 3 which is driven by motor 2; it enters an intake 4 and flows downward in the direction indicated by the arrows to enter precipitators 1 through their bottoms, and it then flows up into the space around the fan and out through the annular outlet 5 in the top of the machine. The top cover 6 of the machine in which the annular outlet 5 is formed has a generally cone-shaped portion 7 depending from its center. The purpose of this cone-shaped portion is to deflect the air from the fan out of the apparatus in a horizontal direction which tends to cause the surrounding air to circulate such that contaminated air will be pushed downward outside of the apparatus and thus sucked more readily into its interior.

While the apparatus is described in connection with the conditioning of air, it is to be understood that it is applicable also to other gases, such as furnace exhausts and the like. While there is disclosed four precipitator tubes symmetrically surrounding the pumps and fan structure, it will be appreciated that any desired number of tubes may be employed for this purpose.

In accordance with one of the principal objectives of the invention, the precipitated particles are continuously washed from the precipitator tubes 1 by forming the outer or collecting electrode as a curtain of water or equivalent liquid, the uniformity of the water curtain being maintained even where the tube is tilted. This curtain is caused to flow uniformly down the cylindrical surface of the tubes 1 so that an unbroken cylinder of liquid is provided. This cylindrical curtain or cylinder of liquid is electrified by applying a potential to it with respect to the central filamentary electrode or heaters 8 positioned along the axis of the walls 9 which form the guide for the fluid. These walls may be of any suitable material, metallic or non-metallic. The fluid is caused to flow continuously by the pump 10 driven by the motor 2, the pump drawing fluid from the reservoir or pool 11 in the bottom of the housing 12 and pumping it up through the tubes 13 into the annular fluid distributor chambers 14 at the top of the precipitator tubes 1.

An important feature of the invention is the following construction which not only causes the fluid to flow in an unbroken, thin film over the entire inner surface of the walls 9 but also permits the apparatus to suffer small tilts from the vertical without destroying the uniformity of this film flow. It will be realized that apparatus designed for non-industrial usage will often be positioned other than in a strictly vertical position by non-expert users. This must be taken into account if a practical apparatus is to be had.

As best illustrated by the Fig. 3, the outer walls of the fluid distributor chambers 14 are formed by cylindrical walls 15 concentrically surrounding each tube 1 and having inwardly projecting flanges 16 to help hold the fluid in; the inner walls are formed by cylindrical collars 16a which are adjustable upward and downward to vary the length of the cylindrical gap 16b between walls 9 and collars 16a. This adjustability permits control of the water flow and the resultant thickness of the film flowing down walls 9.

Suitable means controllable from the exterior of the apparatus may be provided to adjust the axial positions of collars 16a.

The thickness of the water film may also be controlled automatically as a function of the density of the contaminant, whereby an optimum film thickness is obtained for a given density to conserve water and minimize the load on the pump. As shown in Fig. 12, this may be accomplished by means of a light source 50 mounted to project a beam across the precipitator tube, which beam is intercepted by a photocell 51 whose output will depend on the density of the gas particles blocking the light beam. The output of the photocell 51 is amplified by a suitable means 52 and fed to an actuator for controlling the position of the collar 16a, and hence the water gap 16b. The actuator may be a suitable electromagnetic device 53, such that the position of collar 16a is controlled automatically as a function of the density of the contaminant. At the same time the output of amplifier 52 is applied to means for controlling the water pump, whereby as the need for water increases or diminishes the pump operation is correspondingly governed.

Fluid enters fluid distributor chambers 14 tangentially through the tubes 17 which interconnect with tubes 13, as seen in Fig. 2, and whirls about the annular walls of the chambers so that it ends to enter the tubes 1 with a spiral motion. While this spiral motion helps to some extent in maintaining the unbroken uniformity of the film flowing down the walls 9, that uniformity is still better maintained by the annular inwardly projecting lips or weir ring 18 around the top edge of the tubes 1. As the liquid flows over the lips 18 in its downward course, they deflect the liquid toward the walls 9 so that it is brought into early engagement with the walls, and any tendency to dripping, or streaming of the liquid in particular paths over the surface of walls 9, is minimized. This action of the lips 18 in deflecting the course of the flowing liquid toward the walls 9 is in accordance with known hydro-dynamic principles, a familiar example of which is the tendency of fluid which is poured from a bottle or a spout to flow backward into engagement with the outer wall of the bottle or the spout even though the bottle or spout be inclined to the vertical.

The fluid distributor chamber 14 is designed not only to provide a helical flow of liquid throughout the precipitator tube but also to compel the water to cross the weir ring 18, not radially but at an angle thereto for smoother flow. In addition, the water is injected tangentially to impart thereto the required centrifugal force in order to control the water pressure at the gap 16b. The centrifugal force imparted to the water by the jets is also used to counteract the water pressure, thus achieving exact control of the water film and at the same time preventing the uncovering of the film at a considerable degree of tilt.

The water after passing over the weir ring 18 is diverted, in accordance with physical law, from a vertical path toward the wall of the precipitator tube 1, and therefore undergoes peripheral expansion, thereby making it possible to produce a water film as thin as desired, limited only by the inherent viscosity of the liquid. It is known from physics that if an interference is introduced on the side of a smooth column of liquid flow, the entire stream is deflected in the direction of the interference below the point of the inteference. Accordingly, the step on weir ring 18 is designed so that water is deflected sufficiently to make contact with tube 1, thereby reducing the thickness of the water film and effecting an even flow.

In order to prevent a tendency of the incoming air coming into the tubes 1 at the bottom from sucking back into the tubes 1 any water or liquid which is dripping from their bottoms into the pool 11, the construction shown at the bottom of the tubes in Fig. 1, but in better detail in Fig. 4, is provided. As indicated there, the lower end of each tube 1 is surrounded by an annular chamber 19 the inner wall of which is formed by the cylindrical portion 20 of somewhat smaller diameter than the tube 1. These portions 20 project, as indicated, into their tubes 1 and leave annular gaps 21 between themselves and the walls 9. Water flowing down the inner walls 9 goes through the gaps 21 and into the chamber 19 and from there into the pool 11 by way of the ducts 22. This effectively prevents any dripping in the path of the incoming air shown by the arrow and running through the portions 20.

Fig. 3 shows the construction of the central electrode or filament 8. They may be of any suitable form, such as the spiral configuration shown on the insulating support 23, and they may be of sufficient size that they may also be used as heaters in the event that it is desired to use the apparatus as a means of warming the air in any room in which it is used, or for humidifying by evaporation of water flowing down tubes 1. The degree of heat furnished may be readily controlled by varying current flow through the heater elements by suitable control means.

Since the high voltages to which the machine of this kind is subjected tend to cause corona and leakage losses, these are minimized by embedding at least the upper portions of the electrode structure in the insulating material 24. Moreover, the lower ends of the electrodes 8 are equipped with the balls 25 or some other suitable terminal of similar non-pointed configuration which tends to minimize corona discharge. The heating element 8 may consist of a Nichrome or other suitable resistance wire, while the insulating tube support 23 may be formed of dielectric tubing such as asbestos, glass, porcelain or glass-bonded mica.

The current path for the heater coil 8 is through the metallic core 8a is disposed centrally in dielectric tube 23 and connected at its lower end to the lower terminal of coil 8, the current return being through coil 8. By varying the size and shape of the heater wire 8 at the lower end of the center electrode, pre-ionization of the incoming gas may be effected. The heater wire is preferably operated at incandescence, thereby burning off dirt deposits. Thus the center electrode remains clean and the apparatus continues to be operative during uninterrupted use, irrespective of the precipitation density. Where the precipitator is used to draw outside air into a room, the heater electrode is of particular value in that the apparatus cleans, heats and humidifies the air fed into the room. Radiating fins distributed longitudinally on the heater wire may be used to provide a better heat exchange.

The whole apparatus is housed within the insulating, generally cylindrical housing 12 (Fig. 1), having an internal transverse wall 26, also of insulating material, for supporting the various elements, and a bottom wall 27. Occasional replenishment of the pool 11 may be accomplished by pouring liquid in the labyrinth-like inlet 28 of conductive metal. The point of this construction is that the water poured in, as from a spout, cannot drop directly to the pool 11 which might be at a dangerous potential with respect to the user. Since the water must contact the metal surface of the inlet 28 which can be grounded, there is no danger of a direct electrical connection being established between the pool 11 and the user through any column of water which might be dropping from a spout in the user's hands.

Further safety measures are the metallic ring 29 which surrounds the inner wall of the housing 12 and the metallic ball and chain 30. Both this ring 29 and the ball and chain 30 may be grounded which means that if the apparatus should accidentally be tipped during the time when dangerous voltage is applied to the pool 11, the pool 11 will flow into contact with either the ring 29 or the ball and chain 30 and thus be grounded. In any such tilting the ball and chain swings to insure engagement with the pool.

The motor 2 drives both the fan 3 and the pump 10. It may be desirable sometimes to use the unit only as a fan and not as a precipitator. In this case, the motor may be detached from pump 10 by a clutch 31 operable through a knob 32. It is understood, of course, that proper insulation between the pump 10 and the motor shaft is effected so that the dangerous potential of the pool 11 cannot be transmitted to the motor or to the knob 32, and this is readily accomplished by making portions of the motor shaft running to pump 10 of insulating material. The section of the shaft which is of insulating material should, of course, be inserted well above the water level.

Any suitable source of high voltage may be used and positioned at any suitable place in the apparatus. It is illustrated by the high voltage generator 33 (Figures 1 and 2).

In certain circumstances, it may be desirable to eliminate whatever power losses are attributable to the fact of air turbulence in the recurrent flow of the air, i.e., the flow of the air downward from the intake 4 and then in a reverse direction upward through the tubes 1. Fig. 6 illustrates a modified construction to this end. In this case, the tubes 1 need not terminate in the lower chamber 19 construction of Fig. 4. Instead, the bottom wall 27 of the apparatus is pierced by inlet tubes 34 extending upward and slightly into the tubes 1 and the side intake 4 is omitted. Air, thus, flows directly from beneath the machine upward through the tubes 1 and out the outlet 5 in a path of minimum flow resistance. This may be of considerable consequence when the machine is being designed for very maximum capacity.

In this case, the bottoms of the tubes 1 are flared outward, as shown, to prevent restriction of air flow and thereby take full advantage of their capacity. Moreover, the construction is such that the liquid of the film flows outside the tubes 34 to fall into the reservoir 11. The venturi effect produced by the constricted upper ends of tubes 34 is to be noted. The consequent air expansion as air leaves the tubes tends to help keep water against the inner walls 9 of tubes 1.

Additionally, there may be provided at the top of the tubes 34 (or cylindrical portion 20 in Fig. 4) helical, stationary blades 37 (Fig. 6) which give to the air a rotary, cyclonic flow around the axis of the tubes 1. This accomplishes several purposes, as follows. First, it compels the aerosols and other particles to travel a longer distance and, therefore, remain a longer time under the influence of the electrostatic field in the tubes 1, with the net result of more efficient precipitation, i.e., more precipitation obtainable with shorter tubes or better precipitation in a tube of a given length. Secondly, it improves precipitation by giving the particles horizontal impetus under centrifugal force, thus assisting the electrostatic force and propelling the particles toward the outside electrode, i.e., the liquid film. Finally, if rotation of the air be made to coincide in direction and synchronism with the spiral rotation of the water on the surface of the tubes 1, it considerably smoothens the water flow and enables the device to operate with greater efficiency.

Fig. 5 shows the electrical circuit. The source of high voltage 33 is illustrated as a conventional electron tube generator of, say, 18 kilovolts. Its negative terminal is embedded in the pool 11 so that the pool is charged and the positive terminal is connected to grounded center electrode 8, thereby establishing an electrostatic field in the space between electrode 8 and the surrounding cylinder of water. Of course, the reverse polarity may be used relative to ground. That is to say, the center electrode could be connected to the positive terminal of the source, while the water is connected to the negative terminal and grounded. As indicated, the inlet 28 is grounded as is also ball and chain 30 and the ring 29. A suitable resistor 35 protects the high-voltage generator in case of a short circuit.

It will be understood, of course, that as the liquid (usually water) is continually pumped by pump 10 to the chambers 14 and allowed to flow uniformly down the surfaces previously indicated, the potential applied to the pool 11 by the generator 33 will also be applied to the film of water which is flowing down the wall 9. The electrode 8 is grounded, as indicated, through the 117 v. power-line which heats it to incandescence and which also energizes the primary winding 36 of the transformer int he generator. Thus, a high potential exists between the inner electrodes 8 and the water films or curtains flowing downward over the inner surfaces of tubes 1. This high potetnial acts to remove dust, smoke and other particles from the air which is flowing through the conduit tubes 1, and the water washes it into the pool 11.

Referring now to Fig. 7, there is shown a modified form of gas inlet device for the precipitator tube 1, which tube, as in the case of Fig. 6, is flared outwardly at the bottom end to prevent restriction of the gas flow and thereby take full advantage of the tube capacity. The bottom wall 27 of the apparatus is pierced by an inlet tube 38 extending upwardly into the water pool and terminating slightly below the divergent mouth of precipitator tube 1, the upper end portion of the inlet tube being constricted. The convergent upstream wall of inlet tube 38 in conjunction with the divergent downstream wall of precipitator tube 1 produces a venturi effect wherein the resultant air expansion as the air leaves the inlet tube 38 generates a force tending to urge the downwardly flowing water against the inner wall of tube 1.

As distinguished from the inlet tube 34 in Fig. 6, the inlet tube 38 in Fig. 7 is of a larger diameter ($D_2$) than the diameter ($D_1$) of the precipitator tube 1. This feature is of particular value when a high velocity flow is being used. For when there is a high draught of suction at the top of precipitator tube 1, there is developed a corresponding pressure drop at its flared bottom, and as a consequence the fluid instead of falling into the reservoir may be drawn rearwardly into the precipitator tube 1, as indicated by arrows X. This low pressure phenomenon can be obviated only if the air intake tube 38 has an enlarged capacity. Naturally, as the air passes through the venturi of the intake tube it creates high pressure at the throat of the venturi; and by expanding into the divergent mouth of the precipitator tube two effects are attained. First, aerodynamic support is provided for the water film; second, vacuum is eliminated, thus avoiding the danger of the sucking back of water into the precipitator where it might short-circuit the high-voltage electrodes and thereby impair the normal functioning of the device.

The air streamlines formed by venturi action prevent breakup of the water film in the lower cone of the precipitator tube 1 and help create an even water curtain. High velocity air flow is therefore feasible and the system can handle a correspondingly higher volume of contaminated gas. Moreover, the contaminants in the gas are given a component of velocity in the direction of the collector electrode, thereby enhancing the efficiency of the precipitator.

Although in the normal range of air velocities, air does not flow into the chamber containing the water pool 11, with high velocity flow air from the outside might feed onto this chamber to produce local eddies at the mouth of the precipitator tube 1, which in turn suck droplets of water into the tube. This can be explained by the fact that the inrushing air does not evenly approach the peripheral gap between inlet tube 38 and precipitator tube 1, but that depending on the construction of the device and the obstacles in the path of the air stream, there are local jet airstream effects whereof cause the above-noted disturbances. Accordingly, to prevent such disturbances a baffle plate or diaphragm 39 is installed above the water pool 11 to prevent outside air flow flowing into the water chamber, whereby the air in the chamber remains tranquil and the device functions properly. To prevent a situation wherein the suction in precipitator tube 1 is so great as to create a partial vacuum in the water chamber which tends to raise the water level, the diaphragm 39 is perforated as at 40 to maintain atmospheric pressure in the water chamber and to prevent the production of local jet air streams.

An in the case of Fig. 6, the inlet tube 38 may be provided with helical stationary blades (not shown) to impart a rotary, cyclonic flow to the inrushing air about the longitudinal axis of the precipitator tube 1, the rotation of the air being made to coincide in direction and phase with the spiral rotation of the water on the surface of tube 1, thereby smoothing the water flow.

Referring now to Fig. 8, there is shown precipitator tube 1 in conjunction with an inlet tube 41 so arranged as to define a pre-ionization space, whereby incoming air containing suspended particles is passed through successive electric fields, in the first of which the particles are electrically charged and in the second of which the charged particles are precipitated and trapped against redispersion into the air stream.

Inlet tube 41 is provided with a constricted central portion to produce a venturi effect, the upper end of the inlet tube being spaced from the bottom end of the precipitator tube 1 to form a pre-ionization space therebetween which is surrounded by the curtain of water 42 flowing downwardly from the mouth of the tube 1 into the water pool 11. The central electrode of the precipitator is constituted by a dielectric tube 23 and a helical heater coil 8 wound thereon, corresponding to the same element in the embodiment in Fig. 1. Extending through the dielectric tube 23 is a coaxial line formed by an inner conductor 43 and an outer conductor 44. The outer conductor 44 serves as a current path for the heater coil 8 and is connected thereto at the lower end of the coil. The inner conductor 43, which is supported within the outer conductor 44 by suitable dielectric beads 45, projects beyond the outer conductor into the pre-ionization space. Attached to the end of inner conductor 43 and suspended therefrom are ionization electrode vanes 46, which, as shown in Fig. 9, are constituted by four vane sections in quadrature relation. These vanes which are provided with sharp edges to promote ionization effects are preferably given the aerodynamic shape of a symmetrical air foil or some other air foil suitable for the purpose of stabilization. The presence of the vanes in the air stream serves not only to afford a pre-ionization field but also to maintain the central electrode within the precipitator tube 1 in parallel relation to the air stream, thereby preventing mechanical oscillation and vibration thereof.

As with the previously disclosed devices, an electrostatic field is established between the central electrode 8 and the water film on the inner surface of tube 1, the film acting as a collector electrode and being negatively biased relative to the central electrode. The coaxial conductor arrangement 43, 44 is such that a potential independent of the central electrode potential may be impressed on the pre-ionization electrode 46, whereby the optimum electrostatic field for pre-ionization may be established in the annular space formed between electrode 46 and the surrounding water curtain 42. The potential of pre-ionization electrode 46 is fixed by consideration respecting the optimum electrostatic field for collection when center electrode 8 is grounded. Alternatively, of course, the water 11 on the pre-ionization electrode 46 may be grounded, provided the remaining electrodes maintain proper potentials for their respective functions.

It is possible also to operate the pre-ionization electrode at the same potential as that of the central electrode 8, in which event the central electrode structure may be similar to that shown in Fig. 3, with the pre-ionization electrode 46 suspended below the corona ball 25. The span of the vanes on the pre-ionization electrode could be calculated so as to provide maximum pre-ionization without breakdown if the potential thereon is the same as on central eletrode 8. However, where it is found desirable to impress on the pre-ionization electrode a greater potential than that on the central electrode 8, as shown in Fig. 8, then the geometric configuration of the vanes could be of a lesser span or aspect ratio.

The structural means for supporting the pre-ionization electrode 46 are important only in so far as it affects the air flow. In lieu of the use of inner conductor 43 as the sole support for the electrode 46, this support may be reinforced by an insulator surrounding the conductor 43. Another satisfactory reinforcing support may be constituted, as shown separately in Fig. 11, by narrow bars 47 mounted at crossed positions on top of the inlet tube 41 and supporting at the intersection thereof a vertical insulating post 48 to which the electrode 46 may be affixed.

It is to be noted that the pre-ionization means in accordance with the invention is inherently self-cleaning, for whatever contaminant is collected by water curtain 42 is deposited in water pool 11. Thus, there is no need to dismantle the pre-ionizer for regular cleaning as with conventional devices, and the efficiency of the pre-ionizer is not diminished by the accretion of deposits. The pre-ionization electrode may also be heated to burn off particles therefrom.

While there has been disclosed in connection with Figures 8 and 9 a pre-ionization electrode having four vane sections, it will be appreciated that a greater number of vane sections may be employed successfully to establish a pre-ionization field and at the same time mechanically to stabilize the central electrode structure. Thus, as shown in Fig. 10, the pre-ionization electrode involves eight vanes in a symmetrical arrangement.

Referring now to Fig. 13 there is shown still another embodiment of a precipitator comprising a concentric arrangement of tubes. In this arrangement a center tube 54 is provided which is surrounded by a second tube 55, in turn surrounded by a third tube 56. An annular gas passage is defined between tubes 54 and 55 and another such passage is defined between tubes 55 and 56. Distributors (not shown), generally of the type disclosed in connection with Fig. 3, are provided in conjunction with the upper ends of the tubes so as to cause a water film to form on the outer surface of center tube 54 and on both the inner and outer surfaces of second tube 55, as well as on the inner surface of third tube 56. The upper ends of the tubes are provided with lips 54a, 55a and 56a, respectively, which lips serve the same purpose as lip 18 in Fig. 3 in conjunction with the distributor operation. It will be noted that the lip for tube 55 extends both inwardly and outwardly, for the water film is formed on both the inner and outer surfaces thereof.

Established between the water films on tubes 54 and 55 and also between the water films on tubes 55 and 56 are respective potential differences effecting the precipitation of particles from gases in the associated passages. The particles are carried by the water films into water pools, a separate water supply and pool being used in conjunction with each electrode to prevent short circuiting of the applied potentials. It is to be understood that while three concentric tubes are disclosed herein to degne two gas passages, a greater number may be employed, as desired, to produce a series of concentrically arranged annular gas passages. In practice, the different passages may be employed for contaminants which differ, for example, with respect to particle size or density, the electric field in each passage being adapted to precipitate the particular contaminant therein. Separation of the contaminants in the gas prior to their introduction into the lower ends of the tubes may be effected by conventional centrifuge means, whereby heavier particles tend to enter the outer passage and lighter particles the inner passage. It is also to be understood that a precipitator constituted by but two tubes, such as tubes 54 and 55, may be used wherein the inner and outer electrodes are constituted by water films, as distinguished from the arrangement shown in Fig. 3 wherein only the outer electrode is water film. The hollow inner tube 54 may also be provided with suitable heater means and in large installations may be so dimensioned as to serve as a housing for the power supply.

While there has been disclosed what at present are considered to be preferred embodiments of the invention, it is to be understood that many changes and modifications may be made therein without departing from the essential spirit of the invention. It is intended therefore in the appended claims to cover all such changes and modifications as fall within the true scope of the invention.

What is claimed is:

1. In an electrical precipitator, a precipitator tube through which a contaminated gas may flow in a substantially vertical direction, a flow distributor coupled to the upper end of the tube for causing liquid to flow downwardly in a uniform film over the inner surface of the tube, said distributor including an inwardly projecting lip around the upper edge of the tube defining a step between the under-surface of the lip projection and the inner surface of the tube, an annular chamber disposed above said lip and means for injecting liquid tangentially into the chamber, whereby it flows spirally over the lip and down the inner surface of the tube, the hydrodynamic action of said lip causing said liquid to form a thin film on said inner surface, said annular chamber being constituted by a cylindrical wall and a collar concentrically disposed therein to form a circular gap for admitting the liquid over said lip, said collar being axially adjustable to vary the length of the gap and thereby to control the thickness of said water film.

2. An electrical precipitator as set forth in claim 1, wherein the bottom end of said tube is flared outwardly, and a gas inlet tube for directing gas into the bottom of said precipitator tube and having a constricted upper end to produce a venturi effect.

3. An electrical precipitator as set forth in claim 1, wherein the bottom end of said tube is flared outwardly, fluid distributor means for causing fluid to pass in a uniform film over the inner surface of said precipitator tube, a gas inlet tube for directing gas into the bottom of said precipitator tube and having a constricted upper end to produce a venturi effect tending to urge said film against the wall of said precipitator tube.

4. A precipitator, as set forth in claim 3, further including spiral blades disposed in said inlet tube to impart a rotational movement to incoming gas.

5. An electrical precipitator comprising a housing having at its bottom a receptacle for a liquid pool, a vertically positioned precipitator tube disposed above said receptacle, means for passing air from which particles are to be precipitated upwardly through said tube, a flow distributor coupled to the upper end of the tube for causing liquid drawn from said pool to flow downwardly in a uniform film over the inner surface of the tube for return to said pool, said distributor including an inwardly projecting lip around the upper end of the tube defining a step between the under-surface of the lip projection and the inner surface of the tube, an annular chamber disposed above said lip constituted by a cylindrical wall and an axially adjustable collar concentrically disposed therein to form a gap admitting the liquid over said lip and means for injecting liquid drawn from said pool tangentially into the chamber, the hydrodynamic action of said lip causing said liquid to form a thin film on said inner surface, an electrode centrally within said tube, said electrode being constituted by a helix of heater wire, and means to apply a voltage to said electrode relative to said pool to establish an electrostatic field between said electrode and said film.

6. In an electrical precipitator, a precipitator tube through which a contaminated gas may flow in a substantially vertical direction, a flow distributor coupled to the upper end of the tube for causing liquid to flow downwardly in a uniform film over the inner surface of the tube, said distributor including an inwardly projecting lip around the upper edge of the tube defining a step between the under-surface of the lip projection and the inner surface of the tube, an annular chamber disposed above said lip, said annular chamber being constituted by a cylindrical wall and a collar concentrically disposed therein to form a circular gap for admitting the liquid over said lip, said collar being axially adjustable to vary the length of the gap and thereby to control the thickness of said water film, and means for injecting liquid tangentially into the chamber, whereby it flows spirally over the lip and down the inner surface of the tube, the hydrodynamic action of said lip causing said liquid to form a thin film on said inner surface, and means for imparting to the gas as it flows upwardly into said tube a rotary motion in the same direction as that of the spiral motion of the liquid whereby said liquid film is rendered smooth.

7. An electrical precipitator comprising an insulation housing having at its bottom a receptacle for a liquid pool, a vertically positioned precipitator tube disposed above said receptacle, means for passing air from which particles are to be precipitated upwardly through said tube, a flow distributor coupled to the upper end of the tube for causing liquid drawn from said pool to flow downwardly in a uniform film over the inner surface of the tube for return to said pool, said distributor including an inwardly projecting lip around the upper edge of the tube defining a step between the under-surface of the lip projection and the inner surface of the tube, an annular chamber disposed above said lip and constituted by a cylindrical wall and an axially adjustable collar concentrically disposed therein to form a gap admitting the liquid over said lip and means for injecting liquid drawn from said pool tangentially into the chamber, the hydrodynamic action of said lip causing said liquid to form a thin film on said inner surface, an electrode within said tube, and means to apply a voltage to said electrode relative to said pool to establish an electrostatic field between said electrode and said film, said electrode being constituted by an incandescent heating element for heating said gas and burning off particle deposits forming on said electrode.

8. An electrical precipitator comprising an insulation housing having at its bottom a receptacle for a liquid pool, a vertically positioned precipitator tube disposed above said receptacle, means for passing air from which particles are to be precipitated upwardly through said tube, a flow distributor coupled to the upper end of the tube for causing liquid drawn from said pool to flow downwardly in a uniform film over the inner surface of the tube for return to said pool, said distributor including an inwardly projecting lip around the upper edge of the tube defining a step between the under-surface of the lip projection and the inner surface of the tube, and means for flowing liquid drawn from said pool over the lip, the hydrodynamic action of said lip causing said liquid to form a thin film on said inner surface, an electrode within said tube, and means to apply a voltage to said electrode relative to said pool to establish an electrostatic field between said electrode and said film including a groundable labyrinth inlet for filling the pool so that incoming liquid cannot avoid direct contact with the inlet.

9. An electrical precipitator comprising an insulation housing having at its bottom a receptacle for a liquid pool, a vertically positioned precipitator tube disposed above said receptacle, means for passing air from which particles are to be precipitated upwardly through said tube, a flow distributor coupled to the upper end of the tube for causing liquid drawn from said pool to flow downwardly in a uniform film over the inner surface of the tube for return to said pool, said distributor including an inwardly projecting lip around the upper edge of the tube defining a step between the under-surface of the lip projection and the inner surface of the tube, and means for flowing liquid drawn from said pool over the lip, the hydrodynamic action of said lip causing said liquid to form a thin film on said inner surface, an electrode within said tube, and means to apply a voltage to said electrode relative to said pool to establish an electrostatic field between said electrode and said film including means for grounding the liquid in the pool upon excessive tilting of said precipitator.

10. A precipitator, as set forth in claim 9, in which the means is a groundable conductive ring around the inner wall of the housing.

11. A precipitator, as set forth in claim 9, in which the means is a groundable ball and chain arranged to engage said pool upon said excessive tilt of said precipitator.

12. An electrical precipitator comprising a precipitator tube through which a contaminated gas may flow in a substantially vertical direction, the bottom end of the tube being flared outwardly, fluid distributor means including a lip surrounding the upper edge of said tube defining a step between the under-surface of the lip projection and the inner surface of the tube, and means to flow water over said lip to impart a rotational movement thereto whereby a uniform water film is formed on the inner surface of said tube, the hydrodynamic action of said lip causing said liquid to form a thin film on said inner surface, a gas inlet tube for directing gas into the bottom of said precipitator tube and having a constricted upper end to produce a venturi effect tending to urge said film against the wall of said precipitator tube, and stationary spiral blades disposed in said inlet tube to impart a rotational movement to incoming gas in the same direction as the rotational movement of said water flow.

13. A precipitator, as set forth in claim 12, wherein said inlet tube has an internal diameter greater than that of said precipitator tube.

14. An electrical precipitator comprising a housing having at its bottom a receptacle for a liquid pool, a vertically positioned precipitator tube disposed above said pool, said tube having an outwardly flared lower end, fluid distributor means coupled to the upper end of said tube for drawing liquid from said pool and causing it to flow downwardly in a uniform film over the inner surface of said tube for return to said pool, said distributor including an inwardly projecting lip around the upper edge of the tube to define a step between the undersurface of the lip projection and the inner surface of the tube, and means for flowing liquid over the lip, the hydrodynamic action of said lip causing said liquid to form a thin film on said inner surface, an electrode within said tube to establish an electrostatic field therein, a gas inlet tube piercing the bottom of said receptacle and extending through said pool up to the flared lower end of said precipitator tube to feed air therein, the upper end of said inlet tube being constricted to produce a venturi effect forcing said water film against the inner wall of said precipitator tube.

15. A precipitator, as set forth in claim 14, further including a baffle plate disposed above said pool.

16. In an electrical precipitator provided with a precipitator tube through which a contaminated gas may flow in a substantially vertical direction, the bottom end of the tube being outwardly flared, means for causing fluid to pass downwardly over the inner surface of said precipitator tube, and a gas inlet tube for directing gas into the bottom of said precipitator tube and having a constriction therein to produce a venturi effect, the upper end of said inlet tube being spaced longitudinally from the bottom end of said precipitator tube.

References Cited in the file of this patent

UNITED STATES PATENTS

| | | |
|---|---|---|
| 1,250,088 | Burns | Dec. 11, 1917 |
| 1,365,978 | Gallager | Jan. 18, 1921 |
| 1,968,334 | Crowder et al. | July 31, 1934 |
| 2,192,172 | Anderson | Mar. 5, 1940 |
| 2,192,249 | White | Mar. 5, 1940 |
| 2,244,279 | White | June 3, 1941 |
| 2,631,684 | Schmidt | Mar. 17, 1953 |
| 2,668,599 | Whittet | Feb. 9, 1954 |
| 2,696,275 | Pring | Dec. 7, 1954 |
| 2,701,028 | Eilenberger | Feb. 1, 1955 |

FOREIGN PATENTS

| | | |
|---|---|---|
| 197,857 | Great Britain | May 24, 1923 |

UNITED STATES PATENT OFFICE

CERTIFICATE OF CORRECTION

Patent No. 2,937,709                                          May 24, 1960

Alexander P. de Seversky

It is hereby certified that error appears in the printed specification of the above numbered patent requiring correction and that the said Letters Patent should read as corrected below.

Column 4, line 18, for "ends" read -- tends --; column 5, line 15, for "the machine" read -- a machine --; column 7, line 5, for "int he" read -- in the --; line 8, for "potetnial" read -- potential --; line 62, for "onto" read -- into --; column 8, line 6, for "An" read -- As --; column 9, line 64, for "degne" read -- define --; column 10, line 61, for "end" read -- edge --.

Signed and sealed this 25th day of October 1960.

(SEAL)
Attest:

KARL H. AXLINE
Attesting Officer

ROBERT C. WATSON
Commissioner of Patents